(12) United States Patent
Gualandi et al.

(10) Patent No.: US 10,717,574 B2
(45) Date of Patent: Jul. 21, 2020

(54) CAPSULE FOR DISPENSING BEVERAGES AND METHOD FOR ITS MANUFACTURE

(71) Applicant: Coswell S.p.A., Funo di Argelato (IT)

(72) Inventors: Paolo Gualandi, Bologna (IT); Gabriele Degli Esposti, Bologna (IT)

( * ) Notice: Subject to any disclaimer, the term of this patent is extended or adjusted under 35 U.S.C. 154(b) by 319 days.

(21) Appl. No.: 15/531,776

(22) PCT Filed: Nov. 19, 2015

(86) PCT No.: PCT/IB2015/058959
§ 371 (c)(1),
(2) Date: May 31, 2017

(87) PCT Pub. No.: WO2016/079701
PCT Pub. Date: May 26, 2016

(65) Prior Publication Data
US 2017/0334623 A1    Nov. 23, 2017

(30) Foreign Application Priority Data
Nov. 19, 2014   (IT) .............................. MI2014A1999

(51) Int. Cl.
*B65D 65/46*   (2006.01)
*B65B 29/02*   (2006.01)
(Continued)

(52) U.S. Cl.
CPC ............ *B65D 65/466* (2013.01); *B29B 11/12* (2013.01); *B29B 13/06* (2013.01); *B29B 13/10* (2013.01);
(Continued)

(58) Field of Classification Search
CPC ........ B29L 2031/7174; B29K 2001/00; B65D 85/8043; B65D 65/466; B65D 8658/29; B29C 48/154; B29B 11/12; B65B 61/02
(Continued)

(56) References Cited

U.S. PATENT DOCUMENTS

| 4,136,202 A * | 1/1979 | Favre ................ B65D 85/8043 426/77 |
| 7,552,672 B2 * | 6/2009 | Schmed ............ B65D 85/8043 99/295 |

(Continued)

FOREIGN PATENT DOCUMENTS

| EP | 1579792 | 9/2005 |
| EP | 2409932 | 1/2012 |

(Continued)

OTHER PUBLICATIONS

International Search Report dated Feb. 26, 2016 for PCT/IB2015/058959.

*Primary Examiner* — Robert F Long
*Assistant Examiner* — Xavier A Madison
(74) *Attorney, Agent, or Firm* — Clayton, McKay & Bailey, PC (57) ABSTRACT

It is described a capsule (10) for dispensing a beverage comprising: a main body (20) suitable for containing a product (P) to be dispensed, which comprises a bottom (22) and a side wall (24), extending from said bottom (22) and ending with an edge (26); a closing member (30) suitable for sealably closing said main body (20); and at least one first valve means (40) suitable for allowing the beverage to come out from the capsule (10) or for allowing a liquid to enter into the capsule (10). The main body (20) is made from cellulose pulp, the closing member (30) is made from biocompatible material and the capsule (10) further comprises a first sealing film made from edible material comprising at least one salt of alginic acid (23) and positioned inside said bottom (22) of the main body (20) at least at said at least one first valve means (40). It is also described a method for manufacturing a capsule for dispensing a beverage, as defined above.

25 Claims, 6 Drawing Sheets

(51) Int. Cl.
  *B65D 77/20* (2006.01)
  *B65B 61/18* (2006.01)
  *B65B 61/02* (2006.01)
  *B65B 51/10* (2006.01)
  *B65B 7/16* (2006.01)
  *B65D 77/24* (2006.01)
  *B29B 11/12* (2006.01)
  *B29C 43/00* (2006.01)
  *B29B 13/10* (2006.01)
  *B65D 85/804* (2006.01)
  *B29C 48/154* (2019.01)
  *B29B 13/06* (2006.01)
  *B29K 1/00* (2006.01)
  *B29L 31/00* (2006.01)

(52) U.S. Cl.
  CPC .......... *B29C 43/003* (2013.01); *B29C 48/154* (2019.02); *B65B 7/16* (2013.01); *B65B 29/022* (2017.08); *B65B 51/10* (2013.01); *B65B 61/02* (2013.01); *B65B 61/186* (2013.01); *B65D 65/463* (2013.01); *B65D 77/2024* (2013.01); *B65D 77/24* (2013.01); *B65D 85/8043* (2013.01); *B29K 2001/00* (2013.01); *B29L 2031/7174* (2013.01)

(58) Field of Classification Search
  USPC .......................................................... 53/471
  See application file for complete search history.

(56) References Cited

U.S. PATENT DOCUMENTS

| | | | |
|---|---|---|---|
| 2011/0041702 A1* | 2/2011 | Yoakim | B65D 85/8043 99/302 R |
| 2012/0097602 A1* | 4/2012 | Tedford | B65D 65/466 210/500.1 |
| 2012/0294996 A1* | 11/2012 | Crump | B65D 81/267 426/324 |
| 2014/0220191 A1* | 8/2014 | Kelly | B65D 85/8043 426/115 |
| 2018/0319582 A1* | 11/2018 | Footz | B65D 85/8043 |
| 2019/0282022 A1* | 9/2019 | Singer | A47J 31/02 |

FOREIGN PATENT DOCUMENTS

| | | |
|---|---|---|
| EP | 2522234 | 11/2012 |
| EP | 2592021 | 5/2013 |
| WO | WO 2010106202 | 9/2010 |
| WO | WO 20110018363 | 2/2011 |
| WO | WO 2011151626 | 12/2011 |
| WO | WO 2014183219 | 11/2014 |

* cited by examiner

CAPSULE FOR DISPENSING BEVERAGES AND METHOD FOR ITS MANUFACTURE

This application is a United States national phase filing of PCT/I62015/058959, filed Nov. 19, 2015, which claims priority to MI2014A001999, filed Nov. 19, 2014, both of which are hereby incorporated by reference herein in their entireties.

The present invention generally relates to the technical field of capsules for dispensing beverages, in particular coffee, tea, herbal tea, chocolate, flavoured chocolate, ginseng, guarana, pasty compounds for broths, dehydrated dry powders for vegetable soups or substitutes, by the passage of a liquid, usually water, warm or cool under pressure within the capsule itself. More specifically, the present invention relates to a capsule for dispensing a beverage which is completely biocompatible, therefore easily disposable or reusable for fertilization or heating, and at the same time able to increase the effectiveness of beverage dispensing and optimize the organoleptic features thereof. The invention also relates to a method of manufacturing said capsule.

In recent years, there has been an increasing use of capsules for dispensing beverages. Capsules of coffee or other beverages are tiny rigid container made from aluminium or plastic or similar material containing the product to be dispensed. They differ from pods, which consist of a non-rigid paper filter, since they realize a larger thickness of coffee powder than that of pods, making the beverage extraction more intense.

Capsules are currently widespread and have been a great commercial success, due to the low cost of the machines for the preparation of beverages, ease of use and package practicality. However, among the drawbacks are the relatively high price of the capsules and the almost complete incompatibility of the same with the various dispensing systems on the market.

In addition, the use of polymers, typically polypropylene as it is resistant to boiling water, for the manufacture of capsules exhibits considerable problems of disposal, recycling and composting. In particular, the current polymer materials must be separated from residues of powders or food pastes contained therein prior to the beginning of disposal, recycling or composting operations of polypropylene mixed with other substances adapted to accelerate the decay thereof.

U.S. Pat. No. 4,136,202 relates to a capsule containing a substance for making up a drink using an appropriate apparatus. The capsule is essentially composed of a body made from aluminium having the general shape of a truncated cone with a rim at its base, and of a membrane closing the base, also made from aluminium. The membrane is provided with a line of weakness, which due to the pressure generated by the incoming liquid in the capsule, causes the membrane to break, thus creating an opening through which the drink comes out.

EP 2 409 932 discloses a product-containing capsule for making infusions which has, at an upper base thereof, a two-way valve. In use, water at high pressure and high temperature is injected into the capsule, passes through the capsule and comes out therefrom through the valve.

EP 1 579 792 describes a cartridge, made from aluminium or plastic material, comprising a cup portion and a lid portion. The cup portion comprises a base, a sidewall and a rim opposed to the base, to which the lid portion is fixedly attached. The lid portion comprises a lid port defining a first passage for fluid substances and the base of the cup comprises a cup port defining a second passage for fluid substances. The cartridge further comprises valve means mounted on the cup port, which are resiliently openable under pressure of the fluid substance during a beverage extraction phase, so as to allow passage of the fluid substance through the cup port during such beverage extraction phase. In particular, the valve means have one or more linear or cross-shaped incisions or cuts.

EP 2 522 234 relates to a container arranged for containing a dosed quantity of a solid product, from which a beverage is extractable. In particular, the container comprises wall means, made from a material that is impermeable to water and oxygen, which define a cavity containing the solid product. Such a water- and oxygen-impermeable material is an edible film or a biodegradable material selected from a group consisting of: polylactic acid (PLA), biodegradable polymers derived from starch, polyhydroxyalkanoates, microbial polyesters.

However, the capsules currently available on the market have some drawbacks. A first drawback is related to the time and cost associated with their disposal and/or composting. Before it is sent to recycling facilities, the capsule body, typically made of plastic material or aluminium, must be separated from the residues of powders or food pastes contained in the capsule. Moreover, the capsules currently available on the market are configured so as to adapt to the structural features, such as modes of introducing water into the capsule and modes of dispensing beverage from the capsule, of the dispensing machine in which they are introduced. As a result, they do not lend themselves to be used on different dispensing machines.

Therefore, the problem underlying the present invention is to provide a new capsule for dispensing a beverage which is completely biocompatible, and therefore easily degradable and/or compostable, and which at the same time can be used with various dispensing machines available on the market.

Another object of the present invention is to provide a capsule for dispensing a beverage which is able to increase the beverage dispensing effectiveness and to optimize the organoleptic features thereof.

As a result, the invention relates to a capsule for dispensing a beverage and to a method for the manufacture thereof according to the independent claims 1 and 16. Preferred features are disclosed in the dependent claims.

Therefore, according to a first aspect of the invention, a capsule for dispensing a beverage is provided, comprising:
- a main body suitable for containing a product to be dispensed, which comprises a bottom and a side wall, extending from said bottom and ending with an edge;
- a closing member suitable for sealably closing said main body; and
- at least one first valve means suitable for allowing the beverage to come out from the capsule or for allowing a liquid to enter into the capsule.

The capsule is characterised in that said main body is made from cellulose pulp, said closing member is made from biocompatible material and in that it comprises a first sealing film made from edible material comprising at least one salt of alginic acid and positioned inside said bottom of the main body at least at said at least one first valve means.

In this capsule for dispensing beverages, the above drawbacks are solved by its particular configuration that allows it to be fully biocompatible and compatible with the different dispensing machines available on the market, as well as to improve the organoleptic features of the beverage dispensed.

In fact, the cellulose pulp used in the present invention for making the capsule is extremely stable and resistant to boiling water; it does not shave if cut, precut, coined, punched or drilled; and it lacks the memory effect typical of polymers.

Hereinafter the present description and in the subsequent claims, the expression "cellulose pulp" refers to a product with a density of between 600 and 650 Kg/m³ obtained through the crushing and grinding of vegetable fibres resistant to hot water, usually derived from sugar cane or bamboo or other similar natural products, followed by the mixing of the powder thus obtained with plant starches derived from tubers.

The cellulose pulp used in the present invention has a high thermal resistance both in dry atmosphere between −40° C. and 240° C. and in a humid environment at 120° C.

Hereinafter in the present description and subsequent claims, the expression "product to be dispensed" refers to any product in the form of dry powders, concentrates, pastes or creams suitable for dispensing a beverage in solute phase through the passage, inside the capsule itself, of a liquid, usually water, hot or cold under pressure between 2 bar and 20 bar.

Hereinafter in the present description and subsequent claims, the expression "sealing film made from edible material" refers to a film comprising at least one salt of alginic acid which, applied at valve means for the outlet of the beverage from the capsule or for the introduction of a liquid into the capsule, seals such valve means before filling the capsule with the product to be dispensed and until the use of the capsule.

Hereinafter in the present description and subsequent claims, the expression "valve means" refers to an element, of a portion thereof, configured so as to open for allowing a liquid to pass therethrough by effect of a pressure exerted by the same liquid on the element of a portion thereof.

Preferably, such a salt of alginic acid is sodium alginate.

In a particularly preferred embodiment, the sealing film made from edible material is obtained by mixing sodium alginate and calcium chloride in distilled water.

In a preferred embodiment, the edible material comprising at least one salt of alginic acid may be supplemented with flavouring substances. Advantageously, while these substances are perceptible when tasting the beverage, they do not pollute the dispensers of the product to be dispensed of the manufacturing machines.Preferably, the closing member is made from filter paper. A closing member is advantageously obtained that is permeable to liquids and does not require the piercing by the dispensing machine.

In a further preferred embodiment, the closing member made from filter paper is coupled with a film made from micro-perforated cellulose. Preferably, the coupling between the closing member made from filter paper and the micro-perforated cellulose film is obtained by heat sealing at respective peripheral portions. It follows that a gap is defined between the closing member made from filter paper and the micro-perforated cellulose film.

A preferred example of a micro-perforated cellulose film that can be used in the present invention and that is available on the market is the product of the company Corapack S.r.l.

Advantageously, the micro-perforated cellulose film opposes the retraction of the filter paper, allowing the piercing thereof by the dispensing machine. In this way, the closing member of filter paper simulates properties like ductility that are typical of an aluminium closing member known in the art.

While the Applicant does not want to be bound to any interpretive theory, it is believed that the gap between the micro-perforated cellulose film and the closing member made from filter paper placed thereon creates a vibrating effect that makes the beverage being dispensed frothing, thus allowing the dispensing of a beverage having features similar to those of a beverage dispensed by a professional bar machine. This is due to the fact that the micro-perforated cellulose film does not retract.

Advantageously, the closing member made from paper filter seals the main body by means of heat sealing at the edge of the main body and/or by means of the application of a cellulose-based film at said edge of the main body.

In a particularly preferred embodiment, the closing member is made from cellulose pulp. A capsule for dispensing a beverage is advantageously obtained which is entirely made from cellulose pulp and therefore more homogeneous in terms of processing stability, thermal stability and lack of memory effect typical of polymers.

Advantageously, the closing member made from cellulose pulp seals the main body by means of the application of a cellulose-based film at the edge.

In an alternative embodiment, the capsule further comprises at least one second valve means formed at the closing member and suitable for promoting the outlet of the beverage from the capsule or the inlet of liquid into the capsule, and at least one second sealing film made from edible material comprising at least one salt of alginic acid and positioned inside said closing member at least at said at least one second valve means.

Advantageously, the presence of the second valve means promotes the inlet of the liquid in the capsule or the outlet of the beverage from the same and does not require the piercing by the dispensing machine. Moreover, the sealing film made from edible material positioned inside the closing member is able to seal the valve means from the outside environment.

Preferably, the main body made from cellulose pulp is internally and/or externally coated by a cellulose-based film. Advantageously, the capsules thus treated increase stability, resistance and waterproofing of the main body, ensuring a complete internal and/or external sealing thereof. A significant improvement in the performance of the capsules in dispensing the beverage is thus obtained. Moreover, the cellulose-based film advantageously has the features of withstanding the specific high temperatures of beverage dispensing, usually above 90° C., and of being biodegradable. Advantageously, the use of an odourless, colourless, tasteless and biodegradable cellulose-based film allows improving the mechanical resistance of the capsules upon filling with the product to be dispensed.

Preferably, the first and/or second valve means consists of a one-way lamellar valve obtained by making a cut and/or a weakened line at the bottom and/or at the closing member of the capsule. This advantageously allows a self-dispensing capsule to be obtained, which does not require the piercing by the dispensing machine.

Preferably, the weakened line(s) and/or the cut(s) are cross-shaped, arch-shaped, L-shaped or combinations thereof.

In a preferred embodiment, the capsule according to the invention further comprises at least one filter suitable for filtering the incoming liquid. Advantageously, said filter allows the features of the incoming fluid, for example retaining chlorine, chlorinated substances and organic pollutants, to be improved.

Preferably, said filter is made from activated charcoal.

In a further preferred embodiment, the capsule according to the invention further comprises at least one anti-particulate filter suitable for filtering the outgoing beverage. Advantageously, said anti-particulate filter allows using non-soluble leaf or powder products to be dispensed, allowing the particulate that would deteriorate the organoleptic features of the beverage dispensed to be retained.

Preferably, said anti-particulate filter is made from cellulose pulp of non-compacted fibre, filter paper or non-compacted powder vegetable charcoal.

Preferably, the product to be dispensed contained in the capsule may be selected from coffee, tea, herbal tea, chocolate, flavoured chocolate, ginseng, guarana, pasty compounds for broths, dehydrated dry powders for vegetable soups or substitutes.

According to another aspect of the invention, a method for manufacturing a capsule for dispensing a beverage is provided, comprising the steps of:

a) providing a capsule comprising a main body made from cellulose pulp, which comprises a bottom and a side wall, extending from said bottom and ending with an edge;

b) providing a closing member made from biocompatible material, suitable for sealably closing said main body;

c) optionally, internally and/or externally coating said main body with a cellulose-based film;

d) making a cut and/or a weakened line at the bottom of said main body in order to obtain at least one first valve means and applying a first sealing film made from edible material comprising at least one salt of alginic acid inside said bottom of the main body at least at said at least one first valve means;

e) optionally, making a second cut and/or a weakened line at the closing member of said main body in order to obtain at least one second valve means and applying a second sealing film made from edible material comprising at least one salt of alginic acid inside said closing member at least at said at least one second valve means;

f) filling said main body with the product to be dispensed; and g) sealing said main body with said closing member.

Advantageously, a light, rigid and dry capsule is obtained by the method according to the invention described above. Optionally, the main body comprising a bottom and a side wall has a variable thickness. Moreover, the capsule thus obtained has high water resistance and heat resistance features as well as excellent workability. Advantageously, using the cellulose pulp comprising fibres and vegetable starches solves the drawbacks of producing chips and fibres, and it is easier to calibrate the opening load of the valve. In addition, there is a total absence of memory effect of the cellulose pulp. Such a lack of memory effect typical of polymers results in the advantage of keeping an inlet channel instead of an outlet channel open, allowing the implementation of a one-way valve while this is difficult and often impossible with polymers.

Preferably, said steps a) and b) comprise the steps of:

a1) providing a cellulose pulp powder comprising fibres and vegetable starches;

b1) mechanically mixing said powder with water at room temperature until a homogeneous paste is obtained;

c1) subjecting said paste to at least one calendering treatment until a sheet having a thickness comprised between about 0.4 mm and 3 mm is obtained;

d1) mechanically mixing said sheet with water until a starchy suspension of cellulose fibres is obtained;

e1) filtering said suspension through a filtering means inside a mould; and f1) drying at a temperature comprised between 90 and 120° C. and compressing the starchy cellulose fibres trapped in the filtering means until the main body or the closing member is obtained.

In a preferred embodiment of the method according to the invention, in step d1) there is a possible addition of food colorants.

In a preferred embodiment of the method according to the invention, in steps d) and/or e) applying a first and/or second sealing film made from edible material comprising at least one salt of alginic acid is carried out by nebulization or spreading, optionally on a support matrix, according to techniques well known by a man skilled in the art.

For example, the sealing film made from edible material used in the present invention, in particular in steps d) and/or e), can be obtained by mixing 3% (w/v) sodium alginate in distilled water up to obtain a homogeneous viscous paste. The above paste is then evenly percolated, sprayed or laminated on a self-bearing support matrix, for example gelatine, thus creating a film of few μm. Thereafter, the matrix is sprayed or impregnated with a solution of $CaCl_2$ 0.5 M in distilled water for between 10-20 seconds to allow the interface ionic cross-linking of the two compounds, up to obtain an amorphous sealing film. Finally, the filmed and cured matrix is dried with a hot modified dry airflow.

Alternatively, the mixture of 3% (w/v) sodium alginate and $CaCl_2$ 0.5 M in distilled water is spread with constant thickness on a cold plane, thus obtaining a sealing film in the shape of disc or sheet.

In the case of nebulization, two separate sprays (3% (w/v) sodium alginate in distilled water and $CaCl_2$ 0.5 M in distilled water) can be carried out, or preferably a single spray by means of two nozzles.

Preferably, said step g) is carried out by means of heat sealing and/or application of a cellulose-based film at an edge of said main body.

Preferably, the cellulose-based film is applied by nebulization, extrusion or spreading, according to techniques well known by a man skilled in the art.

The cellulose-based film is obtained by dissolving a cellulose powder in an amount of food-grade solvent at a concentration preferably of between 10 and 30% w/w.

Food-grade solvents that can be used in the present invention are selected from the group consisting of: methyl alcohol, acetone and mixtures thereof.

In a further embodiment of the method according to the invention, during step b1) the mixture can be subjected to a cationic process. This advantageously allows increasing the waterproofing of the cellulose pulp by exploiting the adsorption effect.

Further features and advantages of the present invention will appear more clearly from the following detailed description of some preferred embodiments thereof, made hereinafter by way of a non-limiting example only with reference to the accompanying drawings. The different features illustrated and described with reference to the single configurations can be combined as desired. In the drawings.

In the following description, for the illustration of the figures, identical or similar reference numerals are used to indicate structural elements having the same or similar function.

Figure 1:
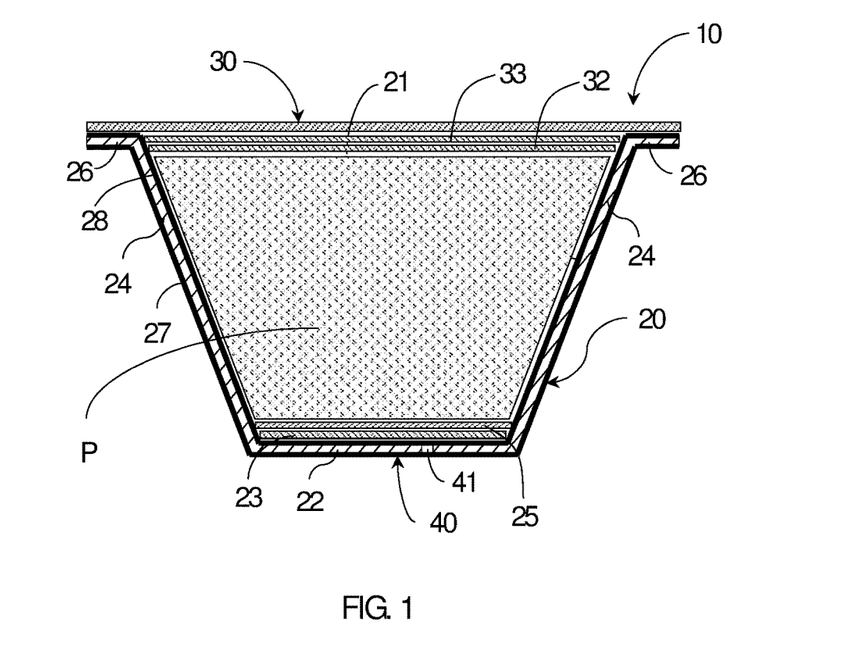
FIG. 1 is an axial sectional view through a capsule according to a first embodiment of the invention, with at least one first valve means in closed position.
Figure 2:
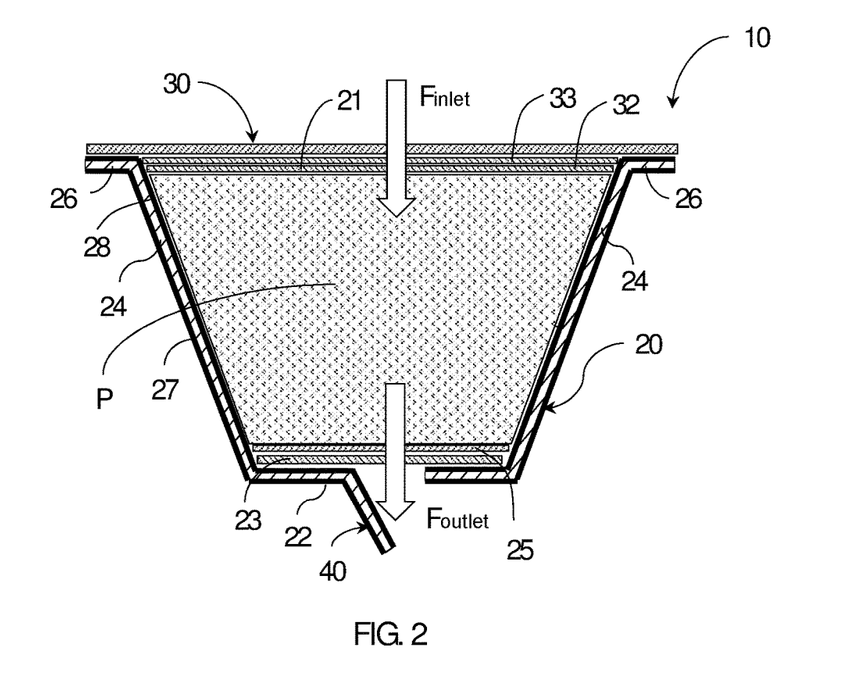
FIG. 2 shows the capsule of FIG. 1 in use conditions, with the at least one first valve means in open position towards the exterior of the capsule, to allow the dispensing of the beverage from the capsule.

With reference to FIGS. 1 and 2, they show a capsule for dispensing a beverage, indicated as a whole with reference numeral 10, according to a first embodiment of the present invention.

The capsule 10 has a main body 20, typically having a shape of a truncated cone, and a closing member 30 adapted to seal the main body 20.

In particular, the main body 20 is adapted to contain a product to be dispensed P, such as coffee, tea, herbal tea, chocolate, flavoured chocolate, ginseng, guarana, pasty compounds for broths, dehydrated dry powders for vegetable soups or substitutes in the form of powder or granules, and it comprises a bottom 22 and a side wall 24, extending from the bottom 22 and ending with an edge 26. The edge 26 is therefore substantially opposite to the bottom 22 and defines an opening 21 of the main body 20 sealed by the closing member 30.

At least one first valve means 40 is provided at the bottom 22 of the main body 20, suitable for allowing the beverage to come out from the capsule 10.

In the embodiment shown, the first valve means consists of a one-way lamellar valve 40 obtained by providing at least one cut 41 in the bottom 22. Alternatively or in addition to the cut 41, one or more weakened lines or similar means may be provided, suitable for ensuring the opening of the one-way lamellar valve 40 when a predetermined pressure is reached inside the capsule 10, as will appear more clearly hereinafter in the present description.

With particular reference to FIGS. 7a to 7d, the cuts and/or weakened lines made in the bottom 22 of the capsule 10 can take any shape suitable for the purpose, such as a cross 41a (FIG. 7a) made at the centre of the bottom 22, a cross 41b made at the centre of the bottom 22 and L-shaped elements 42b arranged around the cross 41b, an arch 41c arranged at the centre of the bottom 22 and a plurality of arches 41d suitably distributed in the bottom 22. However, all possible shapes and combinations of cuts and/or weakened lines suitable for the purpose and within the knowledge of a man skilled in the art fall within the scope of the invention. Size, shape and number of cuts and/or weakened lines depend on product P to be dispensed contained inside the capsule 10.

The bottom 22 of the main body 20 further has, inside the capsule 10 and at least at the one-way lamellar valve 40, a first sealing film made from edible material comprising at least one salt of alginic acid 23, suitable for sealing the one-way lamellar valve 40 from the external environment, in storage conditions of the capsule 10. Preferably, the first sealing film made from edible material comprising at least one salt of alginic acid 23 comprises sodium alginate and calcium chloride and is advantageously odourless, colourless and tasteless.

By suitably modifying the density of the first sealing film made from edible material comprising at least one salt of alginic acid 23, for example by suitably dosing the quantity of sodium alginate and calcium chloride, and its thickness, it is possible to predetermine a hysteresis to the dissolution of such a sealing film 23 suitable for ensuring, upon dispensing the beverage, an infusion time of the product P to be dispensed present inside the capsule 10 which can be preset at about one minute. Moreover, once dissolved in the beverage, the first sealing film made from edible material comprising at least one salt of alginic acid 23 imparts a higher density or "consistency" to the latter.

The first sealing film made from edible material comprising at least one salt of alginic acid 23 can be applied by nebulization, spreading or insertion in the shape of a disc, according to techniques well known by a man skilled in the art.

The main body 20 is made from cellulose pulp which, as described above, is a product with a density of between 600 and 650 Kg/m$^3$ obtained through the crushing and grinding of vegetable fibres resistant to hot water, usually derived from sugar cane or bamboo or other similar natural products, followed by the mixing of the powder thus obtained with plant starches derived from tubers.

In the embodiment shown in FIGS. 1 and 2, the closing member 30 is made from filter paper and seals the opening 21 of the capsule 10, preferably by heat sealing at the edge 26 of the main body 20. Alternatively or in addition to heat sealing, the sealing of the closing member 30 on the main body 20 of the capsule 10 is carried out by interposition of a cellulose-based film between the edge 26 and the closing member 30.

Preferably, the closing member made from filter paper 30 is coupled with a micro-perforated cellulose film 33, for example a product marketed by the company Corapack S.r.l. In particular, the micro-perforated cellulose film 33 is coupled to the closing member of filter paper 30 by heat sealing at a peripheral portion of the surface of the closing member 30 facing inwards of the main body 20 of the capsule 10. It follows that a gap is defined between the closing member made from filter paper 30 and the micro-perforated cellulose film 33. Such a micro-perforated cellulose film 33 opposes the retraction of the closing member of filter paper 30, allowing the piercing thereof by the dispensing machine. In this way, the closing member made from filter paper 30 simulates properties like ductility that are typical of an aluminium closing member known in the art. Moreover, the gap between the micro-perforated cellulose film 33 and the closing member made from filter paper 30 placed thereon creates a vibrating effect that makes the beverage coming out from capsule 10 frothing, thus allowing the dispensing of a beverage having features similar to those of a beverage dispensed by a professional bar machine. This is due to the fact that the micro-perforated cellulose film does not retract.

Preferably, the main body 20 of the capsule 10 is internally and/or externally coated with a biodegradable cellulose-based film 27, 28, which is/are able to withstand the specific dispensing high temperatures of a beverage, usually above 90° C.

Such cellulose-based coating films 27, 28 advantageously increase the stability, resistance and waterproofing of the main body 20. A significant improvement in the performance of capsule 10 in dispensing the beverage is thus obtained.

Advantageously, at a surface thereof facing inwards of the main body 20 of the capsule 10, or downstream of the micro-perforated cellulose film 33, if provided, the closing member 30 has a filter 32 for the incoming liquid into the capsule 10 through the closing member 30. Such a filter 32, for example made from activated charcoal, advantageously allows retaining therein substances such as chlorine, organic pollutants and similar components present in the infusion fluid, thus improving both the features of the infusion fluid and those of the beverage dispensed.

Preferably, an anti-particulate filter 25 is provided at the bottom 22 of the main body 20, suitable for filtering the beverage coming out from the capsule 10. Such an anti-particulate filter 25 is arranged upstream of the first sealing film made from edible material comprising at least one salt of alginic acid 23 and it advantageously allows retaining therein granules of the product P to be dispensed, thus improving the features of the beverage dispensed.

Preferably, such an anti-particulate filter 25 is made from cellulose pulp of non-compacted fibre, filter paper, non-compacted powder vegetable charcoal. More preferably, the anti-particulate filter consists of filter paper with a basis weight of between 15 and 100 g/m².

With reference to FIG. 2, it shows the operation of the capsule 10 of FIG. 1, in an operating condition in which a liquid, usually water at high pressure and high temperature, enters into the capsule 10 through the closing member 30 ($F_{inlet}$) and the beverage comes out from the capsule 10 through the one-way lamellar valve 40 obtained in the bottom 22 of the main body 20 ($F_{outlet}$).

First, the capsule 10 is introduced into a dispensing machine (not shown). Thereafter, the liquid enters into the main body 20 of the capsule 10, passing through the closing member made from filter paper 30 and through the micro-perforated cellulose film 33 optionally coupled to the closing member 30. The liquid is then filtered by the filter 32 arranged downstream of the closing member 30 and comes into contact with the product P to be dispensed, e.g. coffee powder, contained in the main body 20.

After a predetermined infusion time, as a result of the high pressure and high temperature inside the capsule 10, the one-way lamellar valve 40 formed at the bottom 22 opens outwards of the capsule 10 and the first sealing film made from edible material comprising at least one salt of alginic acid 23 dissolves, resulting in the outlet of the beverage from the capsule 10 ($F_{outlet}$).

Due to the presence of the anti-particulate filter 25, the dispensed beverage will be free from grains of the product P to be dispensed, which would deteriorate the taste thereof.

At this point, the capsule 10 can be removed from the dispensing machine and directly disposed of without having to separate product P from the other components of the capsule 10, such as the main body 20 and the closing member 30.

Figure 3:
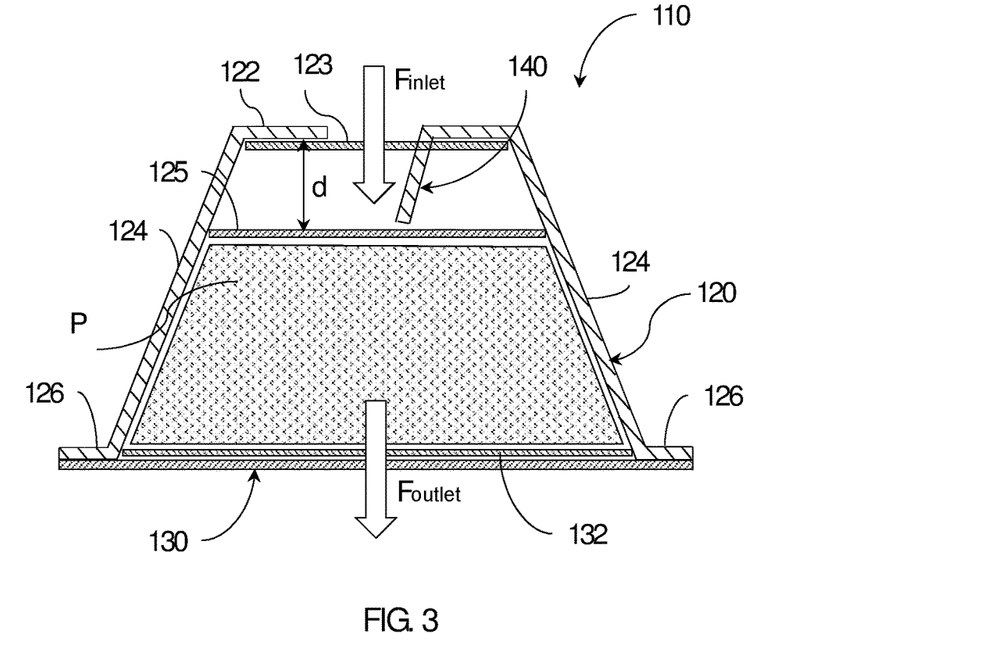
FIG. 3 is an axial sectional view of a variant of the capsule of FIG. 1 in use conditions, with the at least one first valve means in open position towards the interior of the capsule, to allow the inlet of a liquid into the capsule.

With reference to FIG. 3, it shows a variant of the capsule for dispensing a beverage of FIGS. 1 and 2.

The capsule of FIG. 3, generally indicated with the reference numeral 110, has a main body 120, made from cellulose pulp, comprising a bottom 122, a side wall 124 extending from the bottom 122 and ending with an edge 126, and a biodegradable closing member 130, for example made from filter paper, suitable for sealing the main body 120, for example by heat sealing and/or interposition of a cellulose-based sealing film between the closing member 130 and the edge 126 of the main body 120.

At the bottom 122 of the main body 120 is present at least one first valve means, such as a one-way lamellar valve 140 obtained by providing at least one cut 141 and/or a weakened line in the bottom 122. Such a one-way lamellar valve 140 is suitable for allowing the inlet, into the capsule 110, of a liquid, typically water at high pressure and high temperature. The one-way lamellar valve 140 can take all the configurations provided with reference to the one-way lamellar valve 40 of the capsule 10 of FIGS. 1 and 2.

While not shown, the main body 120 may be internally and/or externally coated with respective biodegradable cellulose-based films.

The bottom 122 of the main body 120 has, inside the capsule 120 and at least at the one-way lamellar valve 140, a first sealing film made from edible material comprising at least one salt of alginic acid 123, preferably comprising sodium alginate and calcium chloride, suitable for sealing the one-way lamellar valve 140 from the external environment, in storage conditions of the capsule 110.

Preferably, a filter 125 is provided at the bottom 122 of the main body 120, for example made from activated charcoal, suitable for retaining therein substances such as chlorine, organic pollutants and similar components present in the infusion fluid, thus improving both the features of the infusion fluid and those of the beverage dispensed. Such a filter 125 is arranged downstream of the first sealing film made from edible material comprising at least one salt of alginic acid 123, at a distance d from the bottom 122 such as to prevent the one-way lamellar valve 140, during its opening inwards of the main body 120 of the capsule 110, from intercepting the filter 125, causing the breakage thereof. Preferably, such a distance d is between 1 and 15 mm.

Advantageously, at a surface thereof facing inwards of the main body 120 of the capsule 110, the closing member 130 has an anti-particulate filter 132, which advantageously allows retaining therein granules of the product P to be dispensed, thus improving the features of the beverage coming out from capsule 110.

Still with reference to FIG. 3, it shows the operation of the capsule 110 in an operating condition, opposite to that shown in FIG. 2, in which a liquid, typically water at high pressure and high temperature, enters into the capsule 110 through the one-way lamellar valve 140 made in the bottom 122 of the main body 120 ($F_{inlet}$) and the beverage comes out from the capsule 110 ($F_{outlet}$) passing through the closing member made from filter paper 130.

First, the capsule 110 is introduced into a dispensing machine (not shown). Thereafter, the liquid is supplied to the capsule 110. As a result of the high pressure and high temperature of the liquid, the one-way lamellar valve 140 made in the bottom 120 of the main body 120 opens inwards of capsule 110 and the first sealing film made from edible material comprising at least one salt of alginic acid 123 dissolves, resulting in the inlet of the liquid into the capsule 210 ($F_{inlet}$). The liquid is then filtered by filter 125 arranged downstream of the first film made from edible material comprising at least one salt of alginic acid 123, suitably spaced apart from the bottom 122, and comes into contact with the product P to be dispensed, e.g. coffee powder, contained in the main body 120.

After a predetermined time, the beverage is dispensed, coming out from the capsule 110 passing through the closing member made from filter paper 130 ($F_{outlet}$).

Due to the presence of the anti-particulate filter 132, the beverage obtained will be free from grains of the product P to be dispensed, which would deteriorate the taste thereof.

At this point, the capsule 110 can be removed from the dispensing machine and directly disposed of without having to separate the main body 120 and the closing member 130 from the product P.

Figure 4:
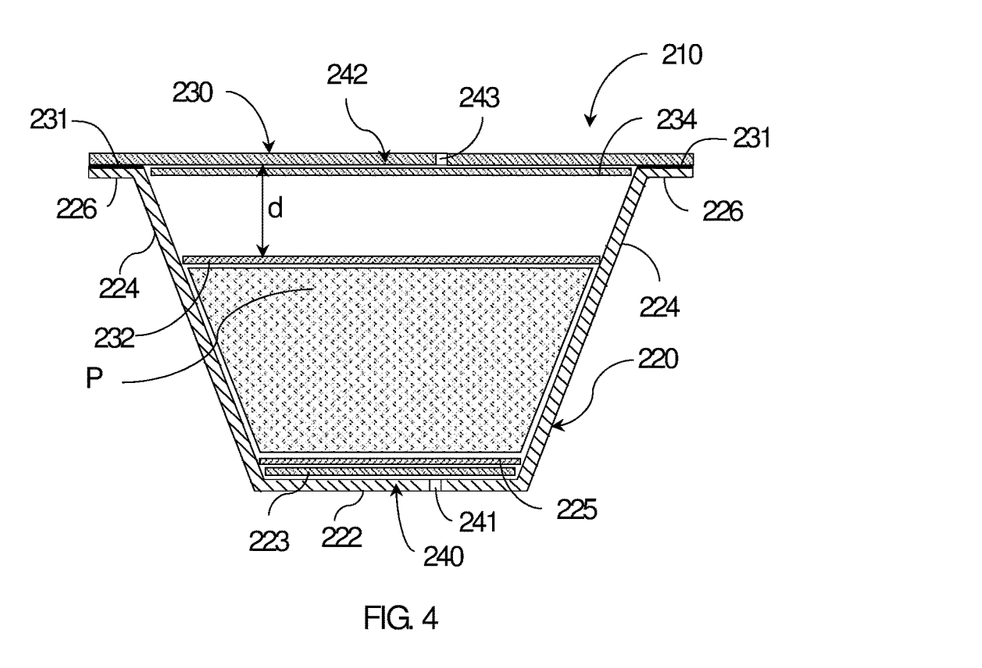
FIG. 4 is an axial sectional view through a capsule according to another embodiment of the invention, with at least one first valve means and at least one second valve means in closed position.
Figure 5:
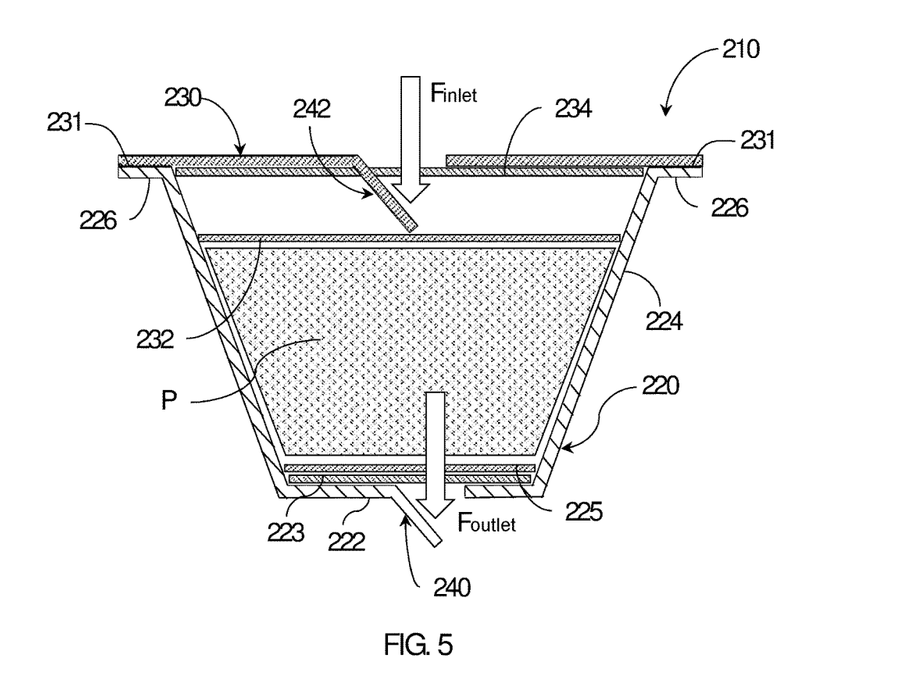
FIG. 5 shows the capsule of FIG. 4 with the at least one first valve means in open position towards the exterior of the capsule, to allow the dispensing of the beverage from the capsule and the at least one second valve means in open position towards the interior of the capsule to allow the inlet of a liquid into the capsule.

FIGS. 4 and 5 show a capsule for dispensing a beverage according to another embodiment of the present invention.

The capsule, generally indicated with the reference numeral 210, has a main body 220, made from cellulose pulp, comprising a bottom 222, a side wall 224 extending from the bottom 222 and ending with an edge 226, and a biodegradable closing member 230, also made from cellulose pulp like the main body 220, suitable for sealing the main body 220. In particular, the closure of the main body 220 by means of the closing member 230 occurs by interposing a cellulose-based film 231 between the closing member 230 and the edge 226 of the main body 220.

At the bottom 222 of the main body 220 is present at least one first valve means, such as a one-way lamellar valve 240 obtained by providing at least one cut 241 or a weakened line in the bottom 210, suitable for promoting the inlet of an infusion liquid into the capsule 210, typically water at high pressure and high temperature. The one-way lamellar valve 240 can take all the configurations provided with reference to the one-way lamellar valve 40 of the capsule 10 in FIGS. 1 and 2.

While not shown, the main body 220 may be internally and/or externally coated with respective biodegradable cellulose-based films.

The bottom 222 of the main body 220 further has, inside the capsule 210 and at least at the one-way lamellar valve 240, a first sealing film made from edible material comprising at least one salt of alginic acid 223, preferably comprising sodium alginate and calcium chloride, suitable for sealing the one-way lamellar valve 240 from the external environment, in storage conditions of capsule 210.

Advantageously, an anti-particulate filter 225 is provided inside the capsule 210, at the bottom 222 and upstream of the first sealing film made from edible material comprising at least one salt of alginic acid 223.

At the closing member 230 of the main body 220 is present at least one second valve means, such as a one-way lamellar valve 242 obtained by providing at least one cut 243 or a weakened line in bottom 210, suitable for promoting the inlet of a liquid, typically water at high pressure and high temperature, into the capsule 210.

The second valve means 242 are totally similar to the first valve means described above with reference to capsules 10 and 110 in FIGS. 1 to 3, so they will not be described in further detail hereinafter.

The closing member 230 has, inside the capsule 210 and at least at the one-way lamellar valve 242, a second sealing film made from edible material comprising at least one salt of alginic acid 234, preferably comprising sodium alginate and calcium chloride, suitable for sealing the one-way lamellar valve 242 from the external environment, in storage conditions of the capsule 210.

Preferably, a filter 232 is provided at the closing member 230, for example made from activated charcoal, suitable for retaining therein substances such as chlorine, organic pollutants and the like present in the infusion fluid, thus improving the features of the incoming infusion fluid as well as those of the beverage dispensed. Such a filter 232 is arranged downstream of the second sealing film made from edible material comprising at least one salt of alginic acid 234, at a distance d from the closing member 230 such as to prevent the one-way lamellar valve 242, during its opening inwards of capsule 210, from intercepting filter 232, causing the breakage thereof.

With reference to FIG. 5, it shows the operation of the capsule 210 of FIG. 4, in an operating condition in which a liquid, usually water at high pressure and high temperature, enters into the capsule 210 through the one-way lamellar valve 242 formed in the closing member 230 ($F_{inlet}$) and the beverage comes out from the capsule 210 passing through the one-way lamellar valve 240 formed in the bottom 222 of the main body 220 ($F_{outlet}$).

First, the capsule 210 is introduced into a dispensing machine (not shown). Thereafter, the liquid is supplied to the capsule 210. As a result of the high pressure and high temperature of the liquid, the one-way lamellar valve 242 formed in the closing member 230 opens inwards of the capsule 210 and the second film made from edible material comprising at least one salt of alginic acid 234 dissolves, resulting in the inlet of the liquid into the capsule 210 ($F_{inlet}$). The liquid is then filtered by the filter 232 and comes into contact with the product P to be dispensed, e.g. coffee powder, contained in the main body 220.

After a predetermined time, as a result of the high pressure and high temperature present inside the capsule 210, the one-way lamellar valve 240 formed in the bottom 222 opens outwards of the capsule 210 and the first film made from edible material comprising at least one salt of alginic acid 223 dissolves, resulting in the outlet of the beverage from the capsule 210 ($F_{outlet}$).

Due to the presence of the anti-particulate filter 225, the dispensed beverage will be free from grains of the product P to be dispensed, which would deteriorate the taste thereof.

At this point, the capsule 210 can be removed from the dispensing machine and directly disposed of without having to separate the product P from the components of the capsule 210, such as the main body 220 and the closing member 230.

Figure 6:
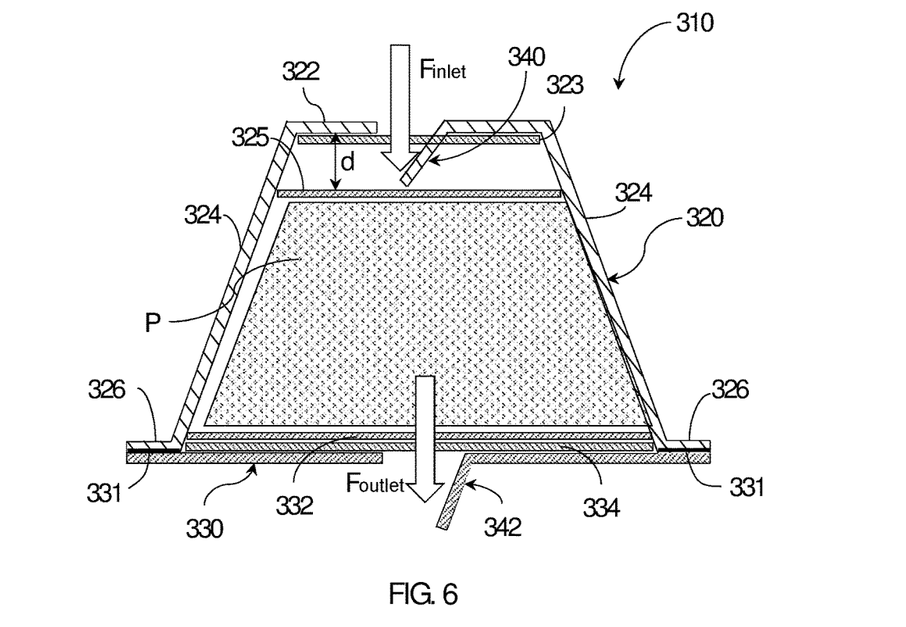
FIG. 6 is an axial sectional view of a variant of the capsule of FIGS. 4 and 5 with the at least one first valve means in open position towards the interior of the capsule, to allow the inlet of a liquid into the capsule and the at least one second valve means in open position towards the exterior of the capsule to allow the dispensing of the beverage from the capsule.
Figure 7A:
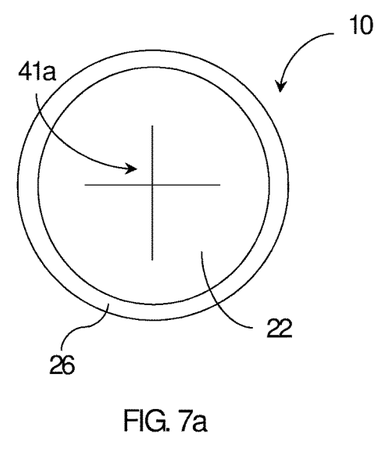
FIGS. 7a-7d are top views of the capsule according to the invention, illustrating different configurations of the valve means.
Figure 7B:
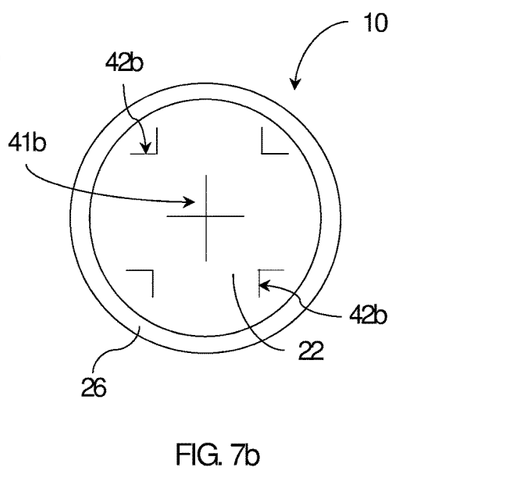
Figure 7C:
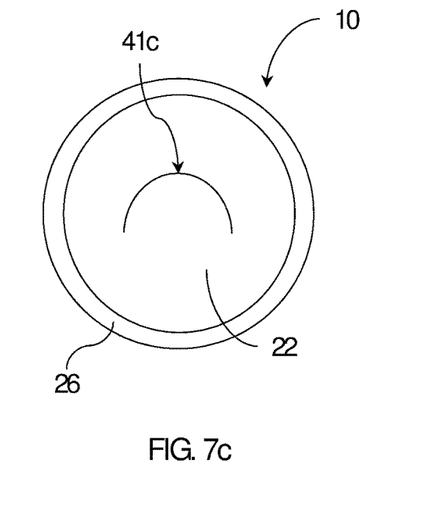
Figure 7D:
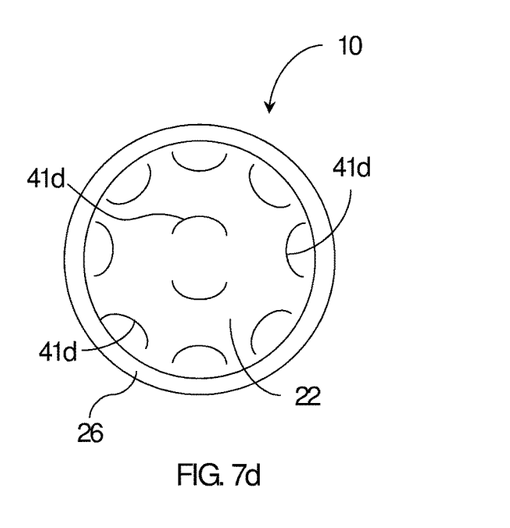

With reference to FIG. 6, it shows a variant of a capsule for dispensing a beverage of FIGS. 4 and 5.

The capsule, generally indicated with the reference numeral 310, has a main body 320, made from cellulose pulp, comprising a bottom 322, a side wall 324 extending from the bottom 322 and ending with an edge 326, and a biodegradable closing member 330, also made from cellulose pulp like the main body 320, suitable for sealing the main body 320. In particular, the closure of the main body 320 by means of the closing member 330 occurs by interposing a cellulose-based film 331 between the closing member 330 and the edge 326 of the main body 320.

At bottom 322 of the main body 220 is present at least one first valve means, such as a one-way lamellar valve 340 similar to that described above with reference to the other embodiments illustrated, suitable for allowing the introduction of an infusion liquid, typically water at high pressure and high temperature, into the capsule 310.

The bottom 322 of the main body 320 further has, inside the capsule 320 and at least at the one-way lamellar valve 340, a first sealing film made from edible material comprising at least one salt of alginic acid 323, preferably comprising sodium alginate and calcium chloride, suitable for sealing the one-way lamellar valve 340 from the external environment, in storage conditions of the capsule 310.

Preferably, a filter 325 is provided at the bottom 322, suitable for retaining therein substances such as chlorine, organic pollutants and the like present in the infusion fluid, thus improving the features of the incoming infusion fluid as well as those of the beverage dispensed. Such a filter 325 is arranged downstream of the first sealing film made from edible material comprising at least one salt of alginic acid 323, at a distance d from the bottom 322 such as to prevent the one-way lamellar valve 340, during its opening inwards of capsule 310, from intercepting filter 325, causing the breakage thereof.

At the closing member 330 of the main body 320 is present at least one second valve means, such as a one-way lamellar valve 342 similar to that described above with reference to the other embodiments illustrated, suitable for allowing the beverage to come out from the capsule 310.

The closing member 330 has, inside the capsule 310 and at least at the one-way lamellar valve 342, a second sealing film made from edible material comprising at least one salt of alginic acid 334, preferably comprising sodium alginate and calcium chloride, suitable for sealing the one-way lamellar valve 342 from the external environment, in storage conditions of the capsule 310.

Advantageously, an anti-particulate filter 332 is provided inside the capsule 310, at the closing member 330 and upstream of the second sealing film made from edible material comprising at least one salt of alginic acid 334, suitable for retaining therein granules of the product P to be dispensed, thus improving the features of the beverage dispensed.

Still with reference to FIG. 6, it shows the operation of the capsule 310 in an operating condition, opposite to that shown in FIG. 5, in which a liquid, typically water at high pressure and high temperature, enters into the capsule 310 through the one-way lamellar valve 340 formed in the bottom 322 of the main body 320 ($F_{inlet}$) and the beverage comes out from the capsule through the one-way lamellar valve 342 formed in the closing member 330 ($F_{outlet}$).

First, the capsule 310 is introduced into a dispensing machine (not shown). Thereafter, the liquid is supplied to the capsule 310. As a result of the high pressure and high temperature of the liquid, the one-way lamellar valve 340 formed in the bottom 322 opens inwards of the capsule 310 and the first film made from edible material comprising at least one salt of alginic acid 323 dissolves, resulting in the inlet of the liquid into the capsule 310 ($F_{inlet}$). The liquid is then filtered by the filter 325 and comes into contact with the product P to be dispensed, e.g. coffee powder, contained in the main body 320.

After a predetermined time, as a result of the high pressure and high temperature present inside the capsule 310, the one-way lamellar valve 342 formed in the closing member 330 opens outwards of the capsule 310 and the second film made from edible material comprising at least one salt of alginic acid 334 dissolves, resulting in the outlet of the beverage from the capsule 310 ($F_{outlet}$).

Due to the presence of the anti-particulate filter 332, the dispensed beverage will be free from grains of the product P to be dispensed, which would deteriorate the taste thereof.

At this point, the capsule 310 can be removed from the dispensing machine and directly disposed of.

Figure 8:
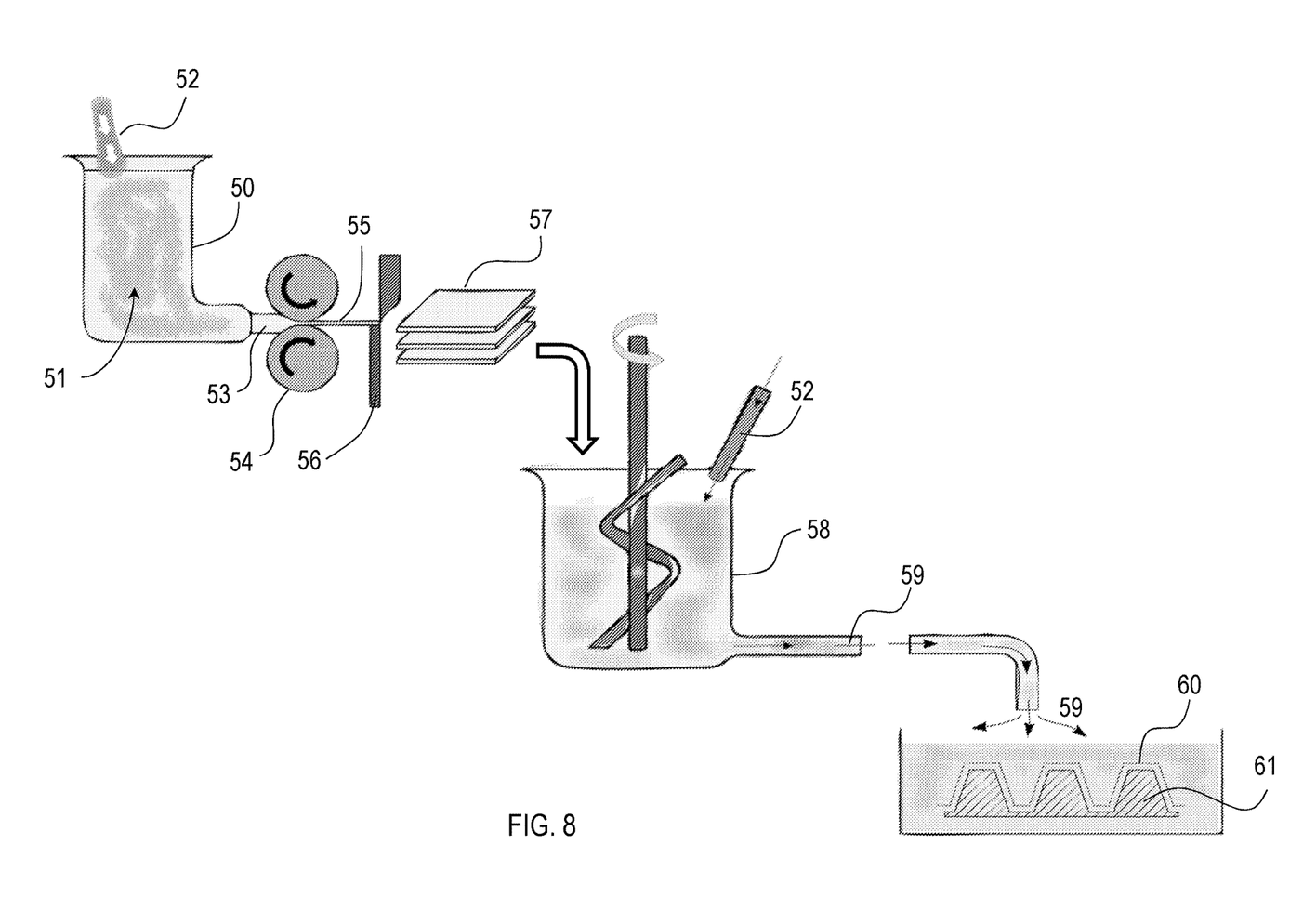
FIGS. 8-10 schematically show the steps of the method for manufacturing a capsule for dispensing a beverage according to the invention.
Figure 9:
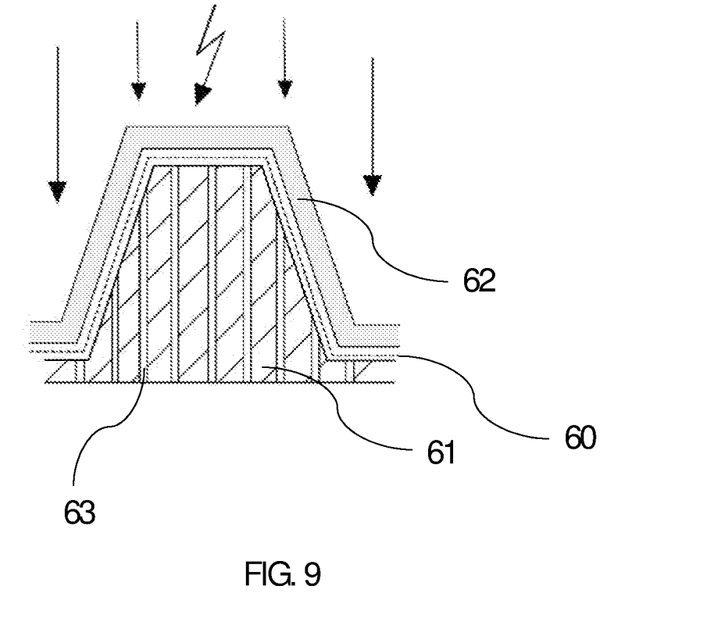
Figure 10:
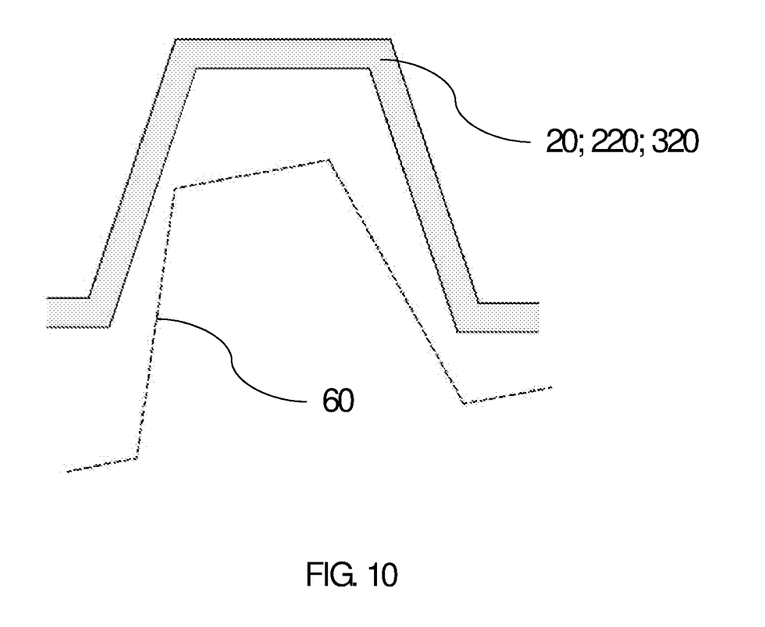

With reference to FIGS. 8-10, a method for manufacturing a capsule according to the invention is described.

The plant for the production of a capsule according to the method of the present invention includes a mixing apparatus 50 in which a cellulose pulp powder comprising fibres and vegetable starches 51 and water 52 are fed.

The mixing is carried out at room temperature until a homogeneous paste 53 is obtained. This homogeneous paste 53 is then discharged from the mixing apparatus 50 and subjected to at least one calendering treatment by means of calendering and compacting rollers 54 until a sheet 55 having a thickness comprised between about 0.4 mm and 3 mm is obtained. Crop ends 57 having predetermined length can be obtained using conventional cutting operations known per se, starting from such a sheet 55, for example by means of cutting shears 56.

These crop ends 57 are fed with water 52 in a mixing apparatus comprising mechanical blades until a starchy suspension of cellulose fibres 59 is obtained.

This suspension 59 is then discharged from the mixing apparatus and filtered by means of a filtering means 60, preferably a metal net, inside a mould 61. Excess water is recovered through suction holes 63 and the cellulose fibres and starch 62 are trapped into the filtering means 60.

Thereafter, the cellulose fibres and starch 62 trapped into the filtering means 60 are dried at a temperature of between 90 and 120° C. using a heat flow 64 until a dry and rigid main body 20, 120, 220, 320 is obtained, comprising a bottom, 22, 122 222, 322 and a side wall 24, 124, 224, 324, extending from the bottom 22, 122, 222, 322, and ending with an edge 26, 126, 226, 326 (FIGS. 1-6).

The method according to the invention can also be used for manufacturing a closing member 30, 130, 230, 330 of said main body 20, 120, 220, 320.

In a further step of the method according to the invention, not shown in the figures, the main body 20, 120, 220, 320 thus obtained can be internally and/or externally coated with a cellulose-based film 27, 28 (FIG. 1).

Preferably, the cellulose-based film 27, 28 is applied by nebulization, extrusion or spreading, according to techniques well known by a man skilled in the art.

In a further step of the method according to the invention, not shown in the figures, the main body 20, 120, 220, 320 and/or the closing member 30, 130, 230, 330 discharged from mould 61 are subjected to at least a first cut and/or a first weakened line at the bottom of said main body in order to obtain at least one first valve means 40, 140, 240, 340. A first sealing film made from edible material comprising at least one salt of alginic acid 23, 123, 223, 323 is then applied inside said bottom 22, 122, 222, 322 of the main body 20, 120, 220, 320 at least at said at least one first valve means 40, 140, 240, 340 (FIGS. 1-6).

In a further step of the method according to the invention, not shown in the figures, a second cut and/or a second weakened line are made at the closing member 230, 330 of said main body 220, 320 in order to obtain at least one second valve means 242, 342. A second sealing film made from edible material comprising at least one salt of alginic acid 234, 334, is then applied inside said closing member 230, 330 at least at said at least one second valve means 242, 342 (FIGS. 1-6).

Preferably, the weakened line(s) and/or the cut(s) are cross-shaped or arch-shaped or combinations thereof (FIGS. 7a-7d).

The main body 20, 120, 220, 320 thus obtained is filled with the product P to be dispensed and is sealed with said closing member 30, 130, 230, 330 by heat sealing and/or application of a cellulose-based film 231, 331 at the edge 26, 126, 226, 326 of said main body 20, 120, 220, 320 (FIGS. 1-6).

The features of the capsule for dispensing a beverage and of its manufacturing method object of the invention as well as the relevant advantages are clear from the above description.

Additional variants of the embodiments described above are possible without departing from the teaching of the invention.

The invention claimed is:

1. A capsule for dispensing a beverage comprising:
    a main body configured to contain a product to be dispensed, the main body comprising a bottom wall and a side wall extending from said bottom wall and ending with an edge;
    a closing member configured to close said main body in a sealing manner; and
    a first valve configured to allow the beverage to come out from the capsule or to allow a liquid to enter into the capsule by effect of a pressure exerted on said first valve by said beverage or said liquid;
    wherein said main body is made of cellulose pulp,
    wherein said closing member is made of biocompatible material, and
    wherein the capsule comprises a first sealing film made of an edible material comprising at least one salt of alginic acid, the sealing film being applied inside said main body on the bottom wall of the main body at least at said first valve.

2. The capsule according to claim 1, wherein said closing member is made of filter paper.

3. The capsule according to claim 2, wherein said closing member is coupled with a film made of micro-perforated cellulose.

4. The capsule according to claim 2, wherein said closing member seals said main body by means of heat sealing at said edge of the main body.

5. The capsule according to claim 4, further comprising a cellulose-based film applied at said edge of the main body.

6. The capsule according to claim 1, wherein said closing member is made of cellulose pulp.

7. The capsule according to claim 6, wherein said closing member seals said main body by means of a cellulose-based film applied at said edge.

8. The capsule according to claim 1, further comprising
    a second valve formed at said closing member and configured to promote the outlet of the beverage from the capsule or the inlet of liquid into the capsule, said second valve being configured to open by effect of a pressure exerted on said second valve by said beverage or said liquid, and
    a second sealing film made of edible material comprising at least one salt of alginic acid, said second sealing film being applied inside said main body on the closing member at least at said second valve.

9. The capsule according to claim 1, wherein the main body made of cellulose pulp is internally and/or externally coated by a cellulose-based film.

10. The capsule according to claim 1, wherein said first valve consists of a one-way lamellar valve obtained by making a cut and/or a weakened line in said bottom wall of the capsule.

11. The capsule according to claim 8, wherein said second valve consists of a one-way lamellar valve obtained by making a cut and/or a weakened line in said closing member of the capsule.

12. The capsule according to claim 10, wherein said cut and/or said weakened line is cross-shaped, arch-shaped, L-shaped or combinations thereof.

13. The capsule according to claim 11, wherein said cut and/or said weakened line is cross-shaped, arch-shaped, L-shaped or combinations thereof.

14. The capsule according to claim 1, wherein said first or second sealing film made of edible material comprises sodium alginate and calcium chloride.

15. The capsule according to claim 8, wherein said first or second sealing film made of edible material comprises sodium alginate and calcium chloride.

16. The capsule according to claim 1, further comprising a filter configured to filter liquid entering into the capsule.

17. The capsule according to claim 1, further comprising an anti-particulate filter configured to filter the beverage dispensed by the capsule.

18. The capsule according to claim 1, wherein the beverage is selected from coffee, tea, herbal tea, chocolate, flavoured chocolate, ginseng, guarana, pasty compounds for broths, dehydrated dry powders for vegetable soups or substitutes.

19. A Method of manufacturing a capsule for dispensing a beverage, comprising:
    providing a capsule comprising a main body made of cellulose pulp and configured to contain a product to be dispensed, the main body comprising a bottom wall and a side wall extending from said bottom wall and ending with an edge;
    providing a closing member made of biocompatible material and configured to close said main body in a sealing manner;
    optionally, internally and/or externally coating said main body with a cellulose-based film;
    making a cut and/or a weakened line in the bottom wall of said main body to form a first valve and applying a first sealing film made of an edible material comprising at least one salt of alginic acid inside said main body on the bottom wall of the main body at least at said first valve, said first valve being configured to open by effect of a pressure exerted on said first valve by said beverage or said liquid;
    optionally, making a further cut and/or weakened line in the closing member of the main body to obtain a second valve and applying a second sealing film made of an edible material comprising at least one salt of alginic acid on the closing member at least at said second valve, said second valve being configured to open by effect of a pressure exerted on said second valve by said beverage or said liquid;
    filling the main body with a product to be dispensed; and
    sealing the main body with said closing member.

20. The method of claim 19, wherein providing the capsule comprises:
    providing a cellulose pulp powder comprising fibers and vegetable starches;
    mechanically mixing said powder with water at room temperature until a homogeneous paste is obtained;
    subjecting said paste to a calendaring treatment until a sheet having a thickness between about 0.4 mm and about 3 mm is obtained;
    mechanically mixing said sheet with water until a starchy suspension of cellulose fibers is obtained;
    filtering said suspension through a filter inside a mold; and drying at a temperature between 90 and 120° C. and compressing starchy cellulose fibers trapped in the filtering means until the main body of the capsule is obtained.

21. The method of claim 19, wherein providing the closing member comprises:

providing a cellulose pulp powder comprising fibers and vegetable starches;

mechanically mixing said powder with water at room temperature until a homogeneous paste is obtained;

subjecting said paste to a calendaring treatment until a sheet having a thickness between about 0.4 mm and about 3 mm is obtained;

mechanically mixing said sheet with water until a starchy suspension of cellulose fibers is obtained;

filtering said suspension through a filter inside a mold; and drying at a temperature between 90 and 120° C. and compressing starchy cellulose fibers trapped in the filtering means until the closing member of the capsule is obtained.

22. The method of claim 19, wherein applying the first sealing film made of edible material comprising at least one salt of alginic acid is carried out by nebulization or spreading, optionally on a support matrix.

23. The method of claim 19, wherein applying the second sealing film made of edible material comprising at least one salt of alginic acid is carried out by nebulization or spreading, optionally on a support matrix.

24. The method of claim 19, wherein sealing the main body is carried out by heat sealing and/or by applying a cellulose-based film at the edge of said main body.

25. The method of claim 19, wherein internally and/or externally coating said main body with a cellulose-based film is carried out by applying said cellulose-based film by nebulization, extrusion or spreading.

* * * * *